(12) United States Patent
Vietz

(10) Patent No.: US 12,440,931 B2
(45) Date of Patent: Oct. 14, 2025

(54) MOBILE PIPE WELDING MACHINE

(71) Applicant: VIETZ GMBH, Hannover (DE)

(72) Inventor: Alexander Vietz, Seelze (DE)

(73) Assignee: VIETZ GMBH, Hannover (DE)

( * ) Notice: Subject to any disclaimer, the term of this patent is extended or adjusted under 35 U.S.C. 154(b) by 368 days.

(21) Appl. No.: 17/938,731

(22) Filed: Oct. 7, 2022

(65) Prior Publication Data

US 2023/0138873 A1 May 4, 2023

Related U.S. Application Data

(63) Continuation of application No. PCT/EP2022/076558, filed on Sep. 23, 2022.

(30) Foreign Application Priority Data

Oct. 28, 2021 (DE) ...................... 10 2021 128 159.8

(51) Int. Cl.
| | | |
|---|---|---|
| *B23K 37/00* | (2025.01) | |
| *B23K 37/053* | (2006.01) | |
| *B23K 37/0533* | (2025.01) | |
| *F16L 1/024* | (2006.01) | |
| *B23K 101/10* | (2006.01) | |

(52) U.S. Cl.
CPC ........ *B23K 37/0533* (2013.01); *B23K 37/053* (2013.01); *F16L 1/024* (2013.01); *B23K 2101/10* (2018.08)

(58) Field of Classification Search
CPC ............ B23K 2101/10; B23K 37/0294; B23K 37/0417; B23K 2103/04; B23K 2103/42; B23K 37/0282; B23K 37/0276; B23K 9/0052; B23K 37/053–0538; B23K 2101/04–125; F16L 1/024
USPC ................................................ 228/49.3, 44.5
See application file for complete search history.

(56) References Cited

U.S. PATENT DOCUMENTS

| | | | |
|---|---|---|---|
| 2,559,703 A | | 7/1951 | Bergman |
| 3,670,945 A | * | 6/1972 | Furstenberger ......... F16L 1/202 228/49.1 |
| 3,848,863 A | * | 11/1974 | Owen ................ B23K 37/0538 269/45 |
| 3,900,146 A | | 8/1975 | Fowler |
| 3,963,231 A | * | 6/1976 | Cooper .............. B23K 37/0538 269/130 |
| 4,990,209 A | | 2/1991 | Rakes |
| 5,814,182 A | | 9/1998 | McElroy, II et al. |
| 10,724,656 B2 | * | 7/2020 | Comalander ...... B23K 37/0533 |
| 10,967,582 B1 | | 4/2021 | Abatie |
| 11,904,414 B2 | * | 2/2024 | Martins .............. B23K 37/0443 |
| 2003/0039509 A1 | | 2/2003 | McIvor |

(Continued)

FOREIGN PATENT DOCUMENTS

| | | | | |
|---|---|---|---|---|
| CN | 102046450 B | * | 12/2013 | ............. B66C 23/36 |
| CN | 103600157 A | * | 2/2014 | ......... B23K 37/0276 |

(Continued)

*Primary Examiner* — Kiley S Stoner
(74) *Attorney, Agent, or Firm* — WCF IP

(57) ABSTRACT

A mobile pipe welding machine includes a welding unit for welding pipes and a pipe receiver for guiding a pipe to the welding unit. The pipe receiver has a distal end facing away from the welding unit and a proximal end facing towards the welding unit. On the distal end there is at least one linearly movable contact body for lifting the pipe.

19 Claims, 7 Drawing Sheets

(56) References Cited

U.S. PATENT DOCUMENTS

| | | | |
|---|---|---|---|
| 2006/0249557 A1* | 11/2006 | Bortoli | B29C 65/2092 |
| | | | 228/49.3 |
| 2018/0243850 A1* | 8/2018 | Schmidt | B23K 9/095 |
| 2021/0362261 A1* | 11/2021 | Bond | B23K 9/0052 |
| 2022/0088697 A1* | 3/2022 | Cook | B23K 9/0286 |
| 2023/0138873 A1* | 5/2023 | Vietz | B23K 37/0294 |
| | | | 29/281.5 |

FOREIGN PATENT DOCUMENTS

| | | | | |
|---|---|---|---|---|
| CN | 105057966 A | * | 11/2015 | |
| CN | 108581262 A | * | 9/2018 | B23K 31/02 |
| CN | 109175873 A | * | 1/2019 | B23K 37/0533 |
| CN | 110977268 A | * | 4/2020 | B23K 37/00 |
| CN | 213865002 U | | 8/2021 | |
| CN | 116140762 A | * | 5/2023 | |
| CN | 116511906 A | * | 8/2023 | |
| DE | 10202010891 A1 | | 7/2020 | |
| EP | 1703187 A1 | | 9/2006 | |
| EP | 3040592 B1 | | 7/2021 | |
| KR | 20110015447 A | * | 2/2011 | |

* cited by examiner

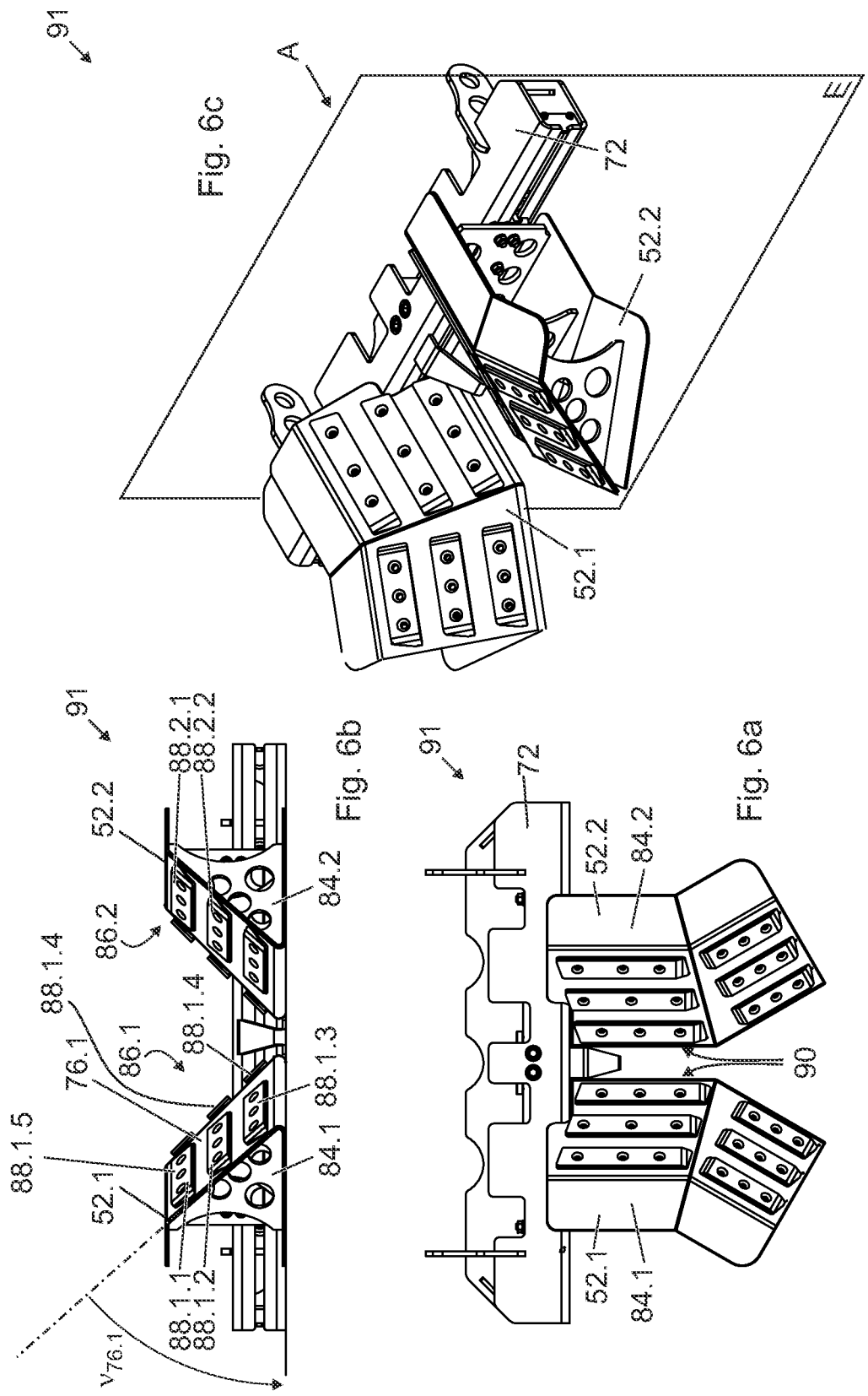

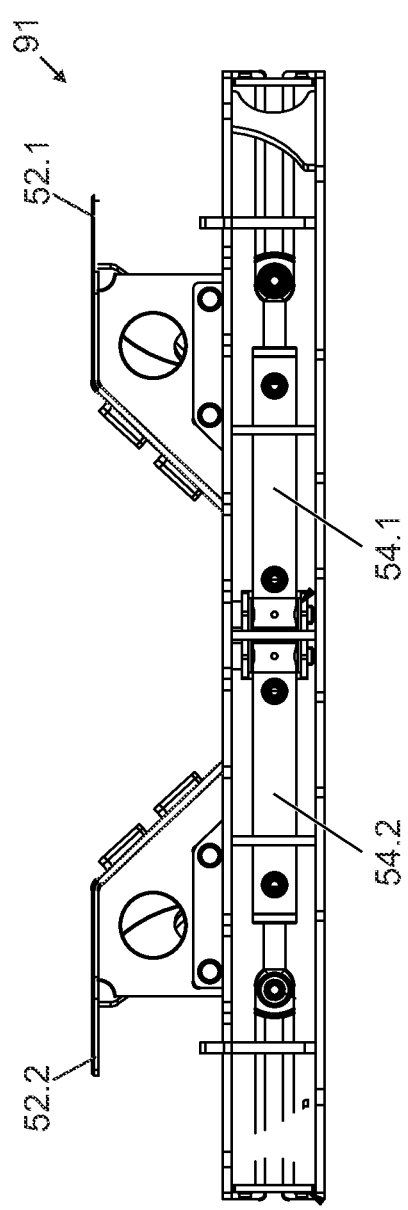
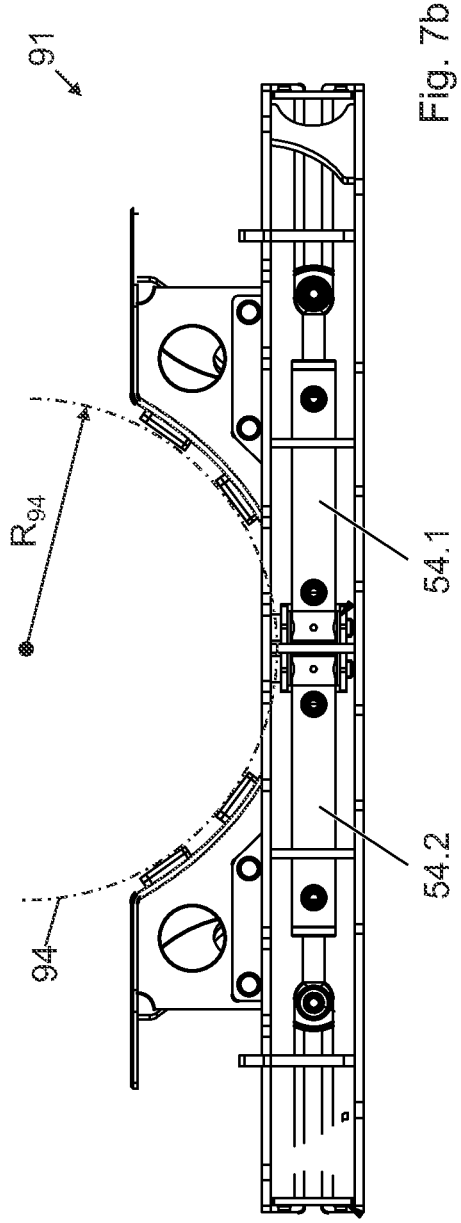

MOBILE PIPE WELDING MACHINE

CROSS-REFERENCE TO RELATED APPLICATIONS

This application is a continuation of International Application PCT/EP2022/076558 filed Sep. 23, 2022 which claims priority to German Application DE 10 2021 128 159.8 filed Oct. 28, 2021.

FIELD OF THE INVENTION

The invention relates to a mobile pipe welding machine with (a) a welding unit for welding pipes and (b) a pipe receiver for guiding a pipe to the welding unit, wherein (c) the pipe receiver comprises (i) a distal end facing away from the welding unit and (ii) a proximal end facing towards the welding unit.

BACKGROUND

Such a pipe welding unit is known, for example, from EP 3 040 592 B1, in which laterally pivotable arms are pivoted towards each other to lift the pipe with a conically tapered roller oriented in the direction of pivoting. The disadvantage of this is that it can result in relatively high surface pressures on the pipe, which is often undesirable. Moreover, this solution usually requires a comparatively material-intensive construction.

SUMMARY

The invention aims to reduce disadvantages of the prior art.

The invention solves the problem by way of a mobile pipe welding machine according to the preamble, the pipe receiver of which comprises, particularly at the distal end, at least one linearly movable contact body for lifting the pipe. In more general terms, the invention solves the problem by way of a mobile pipe welding machine according to the preamble, the pipe receiver of which comprises, particularly at the distal end, at least one non-pivotably mounted, movable contact body designed for lifting the pipe.

The invention also solves the problem by way of a method for welding a pipe featuring the steps (a) moving a pipe welding machine according to the invention towards a pipe, and (b) lifting the pipe by linearly moving the at least one contact body towards the pipe, and where applicable (c) guiding the pipe by means of the pipe receiver to the welding unit and/or (d) welding the pipe to a pipe end of a pipeline section.

The advantage of the invention is that in many cases, the pipe can be lifted with a reduced surface pressure. For example, the contact body can comprise at least one, preferably rotatably mounted, wheel, particularly two or more wheels, which bear against the pipe to lift the pipe. This reduces the surface pressure.

Furthermore, it has been observed that linearly moveable contact bodies can often be produced with less engineering effort than those that can be pivoted.

Another advantage may be that a contact body drive, which is provided to move the contact body, can be selected to be comparatively low-powered and/or structurally simple, or to exert a high force on the pipe. This is especially advantageous when pipes with thick walls or large diameters are to be welded.

Within the scope of the present invention, a mobile pipe welding machine refers in particular to a machine that has its own running gear with its own motor, such that it can move automatically. For example, the pipe welding machine has a chain drive. The pipe welding machine can then also be referred to as a weld bead.

The welding unit is understood to mean a device that is designed to weld pipes, especially plastic pipes and/or steel pipes. In particular, the welding unit is not only suitable for welding as a basic principle, but rather is designed for this task. Specifically, the welding unit is designed to weld automatically. In other words, the welding unit carries out the welding according to a manually or mechanically pre-set start command.

The pipe receiver refers in particular to a device that is designed to guide a pipe that is to be welded to the welding unit. For example, the pipe receiver features a longitudinal conveyor, especially a passive longitudinal conveyor. For example, the passive longitudinal conveyor is a roller conveyor.

The pipe receiver preferably has a pipe receiver longitudinal axis. This pipe receiver longitudinal axis corresponds to the longitudinal axis of a (imaginary) best-fit cylinder of a pipe, in particular when the latter lies with maximum contact on the pipe receiver.

The property that the contact body in particular is not only suitable for lifting the pipe, but is designed for that purpose, is understood specifically to mean that the contact body can be brought into a neutral position and a lifting position. If a pipe lies within an operating area of the contact body, the contact body exerts no force on the pipe when in the neutral position and therefore does not lift it. In the lifting position, on the other hand, the contact body exerts enough force on the pipe in the operating area that the latter is lifted.

It should be noted that the contact body can of course also be in the neutral position and the lifting position when there is no pipe in the operating area. The neutral position and the lifting position are defined in that the at least one contact body can lift a pipe when it lies within the operating area. The operating area is the area in which a pipe can be lifted by the contact body.

According to a preferred embodiment, the at least one contact body has a contact surface that comes into contact with the pipe when the pipe is lifted. Preferably, this contact surface is not convex in shape, but rather is at least partially level or at least partially concave, for example.

A scratch protection made of an anti-scratch material is preferably arranged on the contact surface. The anti-scratch material is preferably not metallic. For example, the anti-scratch material is a polymer. In particular, the anti-scratch material may be an elastomer, a thermoset, a thermoplastic or rubber. The anti-scratch material preferably exhibits entropy elasticity. It has been observed that in known pipe receivers, the pipe may become scratched at the contact point between pipe and end effector for lifting the pipe. This is due to the comparatively high surface pressures. The pipes are usually designed in such a way that scratches do not present a problem during standard operation of the pipeline. Nevertheless, preventing scratches may result in higher strength pipelines.

The contact surface is preferably at least partially concavely curved. As a result, the contact surface can at least partially adapt to the curvature of the pipe.

Preferably, the contact surface has a sliding cylinder radius that differs from a nominal diameter of a pipe to be welded by a maximum factor of 3, especially a maximum factor of 2, preferably a maximum factor of 1.5 The sliding cylinder is the (imaginary) cylinder that comes to rest on the contact surface. The sliding cylinder corresponds to the lateral surface of a pipe that rests on the contact surface.

The nominal diameter is the diameter for which the mobile pipe welding machine is designed. This nominal diameter is known for all pipe welding machines and is indicated, for example, in operating instructions that are preferably part of the pipe welding machine.

According to a preferred embodiment, the at least one contact body has at least one rotatably mounted wheel. In particular, the rotatably mounted wheel is mounted about a wheel rotational axis. It is beneficial if the wheel rotational axis extends at an incline to the horizontal plane. An angle of attack at which the wheel rotational axis extends to the horizontal plane is preferably at least 20°, especially at least 30°.

Preferably, a tilt angle between a projection of the wheel rotational axis onto the horizontal plane on the one hand and a projection of the pipe receiver longitudinal axis onto the horizontal plane on the other is 90°±15°, in particular 90°±5°.

It is practical if the at least one wheel is designed to be spherical. Alternatively, the wheel may also have a cylinder barrel-shaped or concave running surface.

To achieve the smallest possible wheel force between the pipe and the contact body, it may be advantageous for the contact body to comprise at least one omnidirectional wheel, such as a Mecanum wheel or an omni wheel.

The pipe receiver preferably has at least two contact bodies that can be moved towards each other. In particular, the contact bodies are arranged in such a way that they contact a pipe from opposite sides so that horizontally acting force components compensate each other. The contact bodies can preferably be moved linearly towards each other. In particular, the contact bodies are designed to contact the pipe at a height below the longitudinal axis of the pipe and above a height of an underside of the pipe.

According to a preferred embodiment, the pipe welding machine has a first contact body drive, which comprises a first contact body longitudinal guide for guided movement of the first contact body. Alternatively or additionally, the pipe welding machine preferably has a second contact body drive, which comprises a second contact body longitudinal guide for guided movement of the second contact body. It is possible that two contact bodies are moved collectively by one, especially the first, contact body drive.

A longitudinal guide refers to a guide that does not have a fixed pivot point. Preferably, the longitudinal guide extends along a straight line. In particular, the longitudinal guide is designed in such a way that it does not induce a pivot movement, i.e. a movement that can be considered to be pivoting. It is possible, but not necessary, for the longitudinal guide to be completely or partially curved. In this case, the centre point of the circle of curvature, in particular all centre points of the circle of curvature, can be located distally in front of the contact body. In particular, the movement occurs on a linear path. In other words, the longitudinal guide is preferably a linear guide.

The at least one contact body preferably features a base body that is guided on the contact body longitudinal guide. The scratch protection is fixed to the contact body. The base body is made of a base body material that has a base body material hardness. The base body material can be, for example, a metal or an alloy, in particular steel or aluminium.

Preferably, the base body material hardness is at least 80 HV 10 and/or at most 650 HV 10.

An anti-scratch material hardness of the anti-scratch material is preferably lower than the base body material hardness. It is advantageous if the anti-scratch material hardness is at most half, particularly at most one fifth, of the base body material hardness. It is advantageous if the anti-scratch material hardness is at least one five-hundredth of the base body material hardness.

For example, the hardness is the Vickers hardness HV 10 in accordance with DIN EN ISO 6507-1:2018 to -4:2018 or the Shore-D hardness in accordance with DIN EN ISO 868, DIN ISO 7619-1 or ASTM D2240-00.

Preferably, the anti-scratch material hardness is at most 65 Shore D, in particular at most 58 Shore D, for example at most 45 Shore D, preferably at most 35 Shore D, especially preferably at most 30 Shore D. As a result, the pipe is effectively protected against scratches.

According to a preferred embodiment, the anti-scratch material hardness is at least 15 Shore D, in particular at least 20 Shore D. This reduces the wear of the scratch protection.

For example, the anti-scratch material is mounted on the base body in a material-locking or form-fitting manner. For example, the anti-scratch material is vulcanized or glued onto the base body. Alternatively or additionally, the anti-scratch material can be screwed, riveted or otherwise fixed onto the base body.

It is advantageous if both basic bodies are of the same design, but mirror-symmetrical to each other.

It is advantageous if the first and second contact body longitudinal guides extend transversely towards each other. Preferably, the contact body longitudinal guides extend towards each other in a V shape. When the contact bodies move towards each other, i.e. the pipe receivers in particular move towards each other, the contact bodies then move with a movement component in the proximal direction.

The first contact body longitudinal guide extends particularly at a first bevel angle to the pipe receiver longitudinal axis that is at least 30°, especially at least 40° and/or at most 85°, especially at most 75°. Alternatively or additionally, the second contact body longitudinal guide extends particularly at a second bevel angle to the pipe receiver longitudinal axis that is at least 30°, especially at least 40° and/or at most 85°, especially at most 75°.

The pipe welding machine preferably has a run-up skid for guiding a pipe onto the pipe receiver when a pipe is moving in a proximal direction. In other words, the run-up skid is preferably arranged in such a way that a pipe that is moved onto the pipe receiver is passively lifted from the run-up skid onto the pipe receiver, in particular its longitudinal conveyor.

The run-up skid is preferably arranged proximally in the longitudinal direction in relation to the pipe receiver longitudinal axis behind a distal end of the contact body in the neutral position. The run-up skid preferably features a run-up surface that extends transversely to a horizontal plane. A run-up plane angle of inclination at which the run-up skid is inclined on average is preferably at least 15°, especially preferably at least 30° and/or at most 70°, especially at most 60°. If the run-up surface is curved—as provided for according to a preferred embodiment—the run-up surface angle of inclination is the angle of inclination of a compensation surface through the run-up surface.

It is advantageous if (a) the pipe receiver has a main section and a foot section, (b) the foot section is arranged at the distal end of the pipe receiver, and (c) the foot section is hinged on the main section such that it can be pivoted. When the pipe welding machine is in the operating position, the foot section preferably extends along the ground and the main section does not extend along the ground, but rather at an angle to it/at an angle of attack of at least 5°, especially 10° and/or at most 35°, especially at most 25°.

To enable an automated or at least partially automated lifting of the pipe, the pipe welding machine preferably has a pipe position sensor for recording a position of pipe located in front of the pipe receiver in terms of a direction of travel of the pipe welding machine.

The pipe welding machine preferably comprises a control unit that is designed to control the at least one contact body drive if the pipe position sensor falls short of and/or detects a predetermined distance to the pipe. In particular, the control unit is connected to the pipe position sensor and the contact body drive.

The pipe position sensor may be a contactless pipe position sensor or a tactile pipe position sensor. For example, the pipe position sensor is an optical sensor. In this way, the pipe position sensor may comprise a light barrier, an ultrasound sensor and/or a camera. The camera may have, for example, an image recognition system and/or a runtime camera.

The pipe position sensor may also be an electrical sensor. For example, the pipe position sensor records a change in the dielectric constant.

The pipe position sensor is, for example, a touch sensor arranged in such a way that it strikes the pipe when the predetermined distance to the pipe is not reached. If the pipe position sensor is a touch sensor, it can comprise a touch body, for example in the form of a flap, a pin or a cord.

According to a preferred embodiment, the pipe welding machine comprises a camera, the contact body being located in its field of vision, for recording images and/or a screen for displaying the images, for example in a driver's cabin of the pipe welding machine.

DESCRIPTION OF THE DRAWINGS

In the following, the invention will be explained in more detail with the aid of the accompanying drawings. They show.

DETAILED DESCRIPTION

Figure 1:
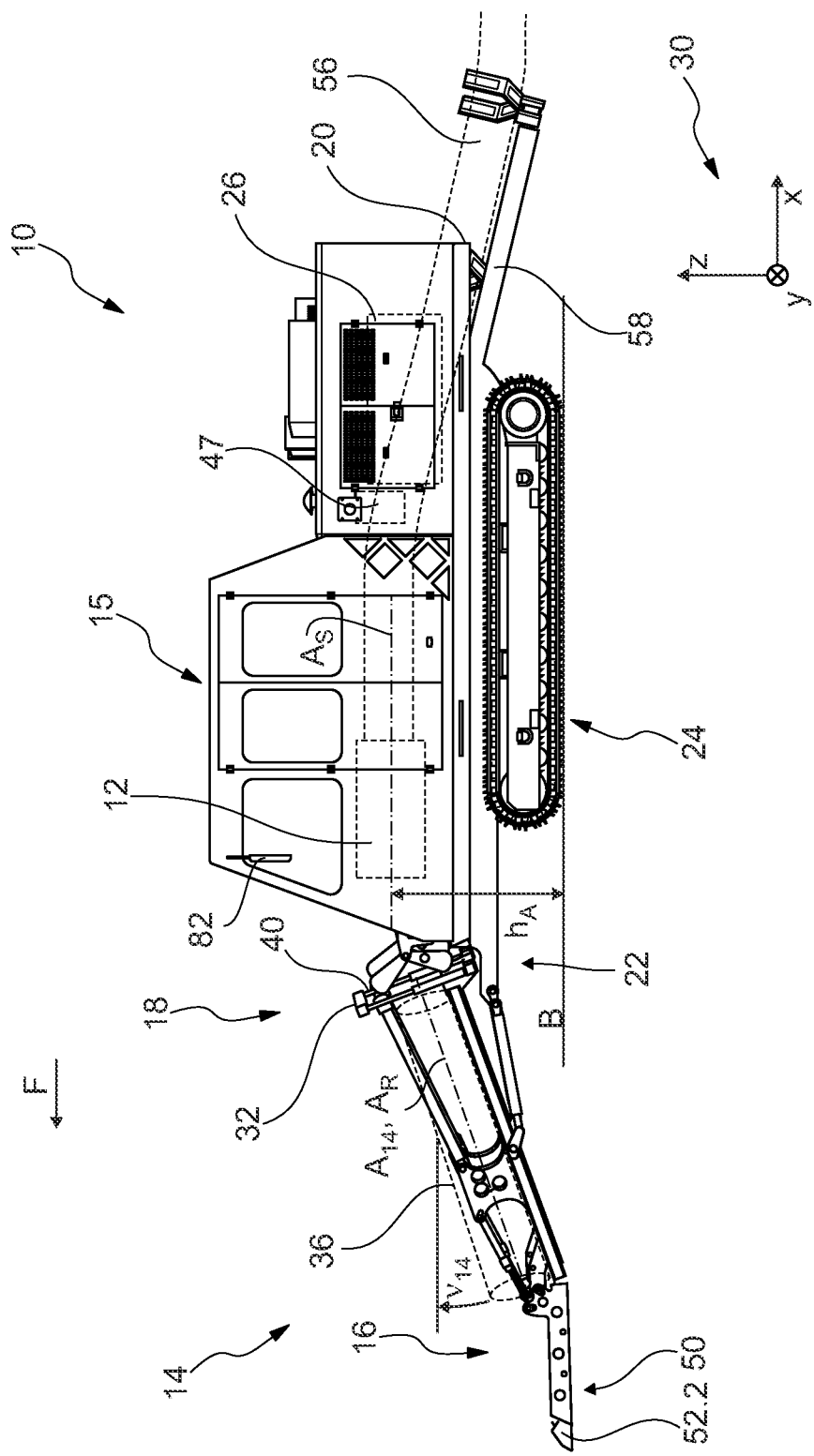
FIG. 1 a side view of a pipe welding machine according to the invention.

FIG. 1 shows a specific view of a pipe welding machine 10 according to the invention, which has a welding unit 12 and a pipe receiver 14. The welding unit 12 may be arranged in a driver's cabin 15. The pipe receiver 14 comprises a distal end 16, which is spaced apart from the welding unit 12, and a proximal end 18. The pipe receiver 14 is fixed at the proximal end 18 to a chassis 20 of the pipe welding machine 10. An elevation of the proximal end 18 can be changed by means of a movement device 22.

The pipe welding machine 10 has a running gear 24 that is driven by a motor 26, for example a diesel motor. The pipe welding machine 10 is therefore self-propelled. In the present case, the running gear 24 is designed as a chain drive, so that the pipe welding machine 10 can also be referred to as a weld bead.

Figure 2:
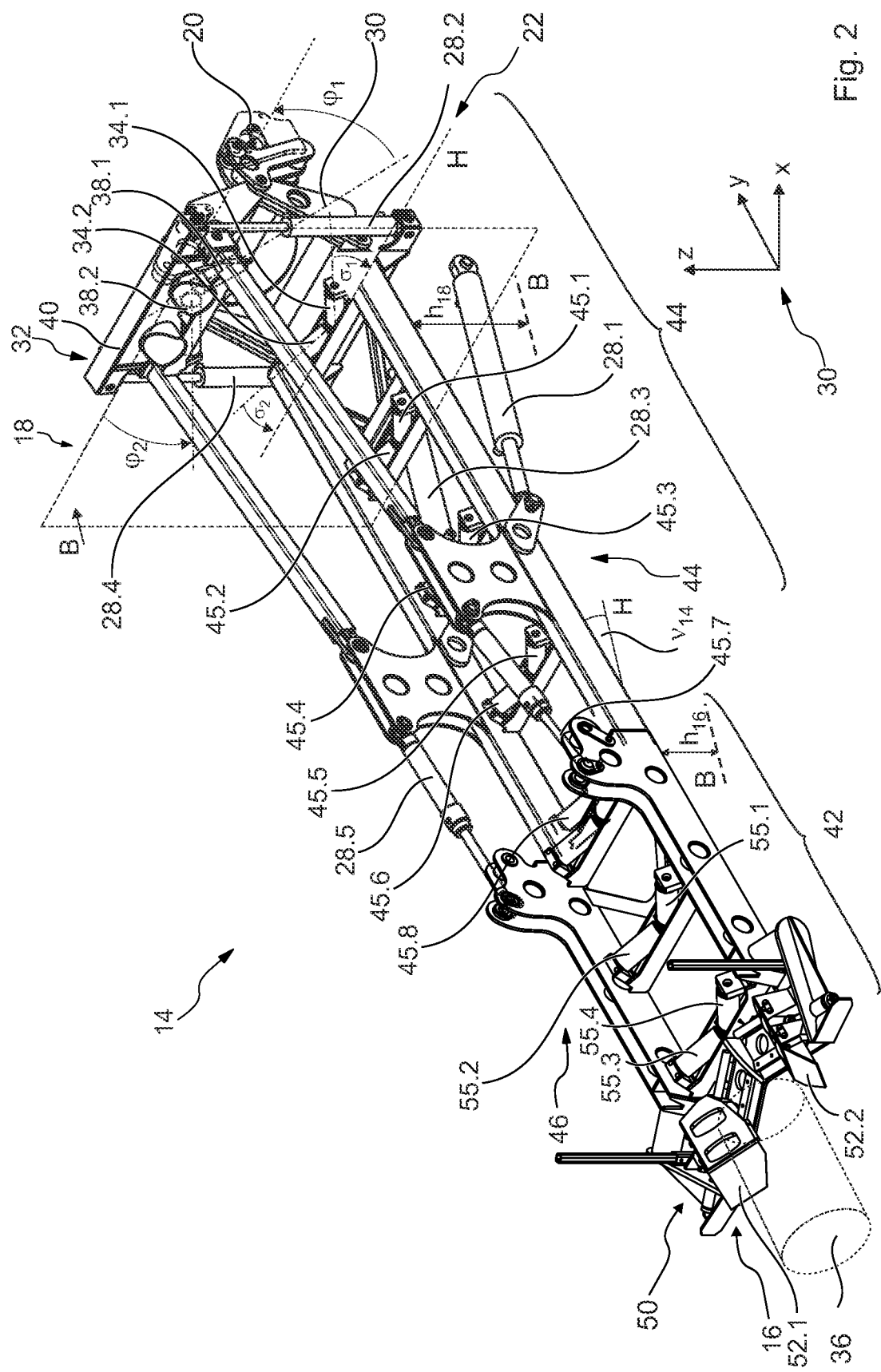
FIG. 2 a perspective view of the pipe receiver of the pipe welding machine according to FIG. 1, FIG. 3 a perspective view from above onto the distal end of the pipe receiver, which could also be referred to as receiving head, according to FIG. 2, FIG. 4 in the partial FIG. 4a, a frontal view of the distal end of the pipe receiver according to FIG. 3 and in the partial FIG. 4b, a side view of the distal end of the pipe receiver according to FIG. 3, and FIG. 5 a partial sectional view along the line A-A according to FIG. 4b, FIG. 6 in the partial FIG. 6a, a perspective view from obliquely above of the receiving head of a pipe welding machine according to the invention, in accordance with a preferred embodiment, in the partial FIG. 6b, a frontal view of the receiving head and in the partial FIG. 6c, a frontal view obliquely from the side of the receiving head and FIG. 7 in the partial FIG. 7a, a view from behind of the receiving head in viewing direction A according to FIG. 6c and in partial FIG. 7b, a view from behind of a pipe receiver head of a pipe welding machine according to the invention, in accordance with a further preferred embodiment.

FIG. 2 shows a perspective view of the pipe receiver 14. It should be noted that the movement device 22 is designed as a hydraulic drive and features a first hydraulic cylinder 28.1. A height $h_{18}$ of the proximal end 18 can be changed by means of the first hydraulic cylinder 28.1. Alternatively, a ball screw drive by an electric motor can also be used, for example.

When the first hydraulic cylinder 28.1 is extended, a swing arm 30 pivots upward, thereby increasing the height $h_{18}$. The height $h_{18}$ is the distance of the proximal end 18 from the ground B on which the pipe welding machine 10 stands. The height $h_{18}$ corresponds to a z coordinate in a coordinate system 30 in which the x axis and y axis extend horizontally and at the height of the ground.

Extending the hydraulic cylinder 28.1 increases the height $h_{18}$ of the distal end 16.

The pipe welding machine 10 comprises a pipe centering 32, which could also be referred to a pipe centering device. The pipe centering 32 features a first support roller 34.1 and a second support roller 34.2. The two support rollers 34.1, 34.2 extend at a respective support roller angle $\sigma_1$, $\sigma_2$ to the horizontal H. The support rollers 34.1, 34.2 form a concave support structure for a pipe 36. The support roller angle $\sigma$ is measured from the upper edge of the respective support roller to the horizontal H. Only if the support roller is cylindrical does it coincide with the angle between the rotational axis and the horizontal H.

The pipe centering 32 features a first guide roller 38.1 and a second guide roller 38.2, which are depicted by the dashed line. The two guide rollers 38.1, 38.2 are inclined at a respective guide roller angle $\varphi_1$, $\varphi_2$ to the horizontal H. The guide rollers 38.1, 38.2 are fixed to a yoke 40, the position of which in relation to the support rollers 34.1, 34.2 can be changed by means of a second hydraulic cylinder 28.2. This allows the centering inner circle diameter of a centering inner circle to be adjusted. The centering inner circle corresponds to the outer diameter of the pipe 36 that is touched by all support and guide rollers 34.1, 34.2, 38.1, 38.2.

As shown in FIG. 2, the pipe receiver 14 features a foot section 42 at the distal end 16, which is hinged on a main section 44. The main section 44 is fixed to the chassis 20. By means of a hydraulic cylinder 28.5, the foot section 42 can be pivoted relative to the main section 44.

The pipe receiver 14 features a plurality of rollers 45.i (i=1, . . . , N; 2<N<200, here N=8) that form a roller conveyor. The support rollers 34.1, 34.2 are arranged in extension of the roller conveyor 46. An imaginary pipe resting on the rollers 45.i can roll onto the support rollers 45.i, preferably without constraining forces that lead to a buckling load of the pipe.

FIG. 1 shows that the welding unit 12 has a welding axis $A_S$ that, as a rule, extends horizontally. The welding axis $A_S$ is located at a welding axis height $h_A$ above the ground. When the welding unit 12 welds a pipe (see FIG. 2) to a pipeline part 56, which may rest on a pipeline guide 58, the longitudinal axis, i.e. the cylinder axis of the pipe extends at welding axis height $h_4$. By means of the movement device 22 shown in FIG. 2, a pipe can always be positioned relative to the welding unit in such a way that a pipe longitudinal axis $A_R$ coincides with the welding axis $A_S$. The pipe receiver 14 has a pipe receiver longitudinal axis $A_{14}$, which corresponds to the pipe longitudinal axis $A_R$ when the pipe 36 rests on the pipe receiver 14.

For receiving the pipe 36, a machine control unit 47 drives the movement device 22 in such a way that the hydraulic cylinder 28.1 initially retracts. This reduces the height $h_{16}$ of the distal end 16 until it rests on the ground B. An angle of inclination $v_{14}$ between the main section 44 of the pipe receiver 14 and the horizontal H is then $v_{14}=10°$, for example. The angle of inclination is determined by means of a pipe that has been received by the pipe receiver 14 on the main section 44.

In FIG. 2, the foot section 42 and the main section 44 are depicted in their unfolded position, in which they are arranged behind each other. To facilitate transportation of the pipe welding machine 10, the foot section 42 can be folded up into a folded position: it then extends along the main section 44. Compared to the angular position in the folded position, the foot section 42 in the unfolded position is pivoted by approximately 180°.

During operation, the machine control unit drives the running gear 24 in such a way that the pipe welding machine 10 moves forwards in a direction of travel F towards the pipe 36. This pushes the pipe 36 onto the foot section 42. To protect a face of the pipe 36, it is advantageous to lift the face of the pipe 36 by means of a pipe lifter 50.

FIG. 2 shows that the pipe lifter 50 has two contact bodies 52.1, 52.2, which are spaced apart from each other transversely to the longitudinal direction of the pipe. By means of at least one contact body drive 54.1 (see FIG. 3), which is, for example, a hydraulic cylinder, the contact bodies 52.1, 52.2 can be moved towards each other. This lifts the pipe 36. When the pipe welding machine 10 continues to move forward, the pipe 36 then moves onto rollers 55.$j$ ($j$=1, 2, 3, 4) of the foot section 42. The rollers 55.$j$, 45.$j$ and the support rollers 34.$i$ form a support for the pipe 36.

As an option, the hydraulic cylinders 28.1, 28.2 can be subsequently extended. This reduces the angle of inclination $v_{14}$. The pipe welding machine 10 now continues to move forward until the pipe is received on the pipe receiver 14. It is possible, but not necessary, for the pipe to rest across its entire length on the pipe receiver 14.

Subsequently, the hydraulic cylinders 28.1, 28.2 can continue to be extended until the entire pipe receiver 14, i.e. the main section 44, assumes an angle of inclination of $v>0°$, for example. The pipe 36 located on the pipe receiver 14 then slopes downward towards the proximal end 18 and pushes in this direction. However, it is also possible that the inclination of the pipe receiver 14 remains unchanged, while the pipe 36 is pushed upwards onto the pipe receiver 14.

The extension of the hydraulic cylinders 28.1, 28.2 also raises the pipe 36, so that its pipe longitudinal axis $A_R$ coincides with the welding axis $A_S$. The pipe is subsequently welded to the existing pipeline section, i.e. a pipe end of a pipeline section, by means of the welding unit.

Figure 3:
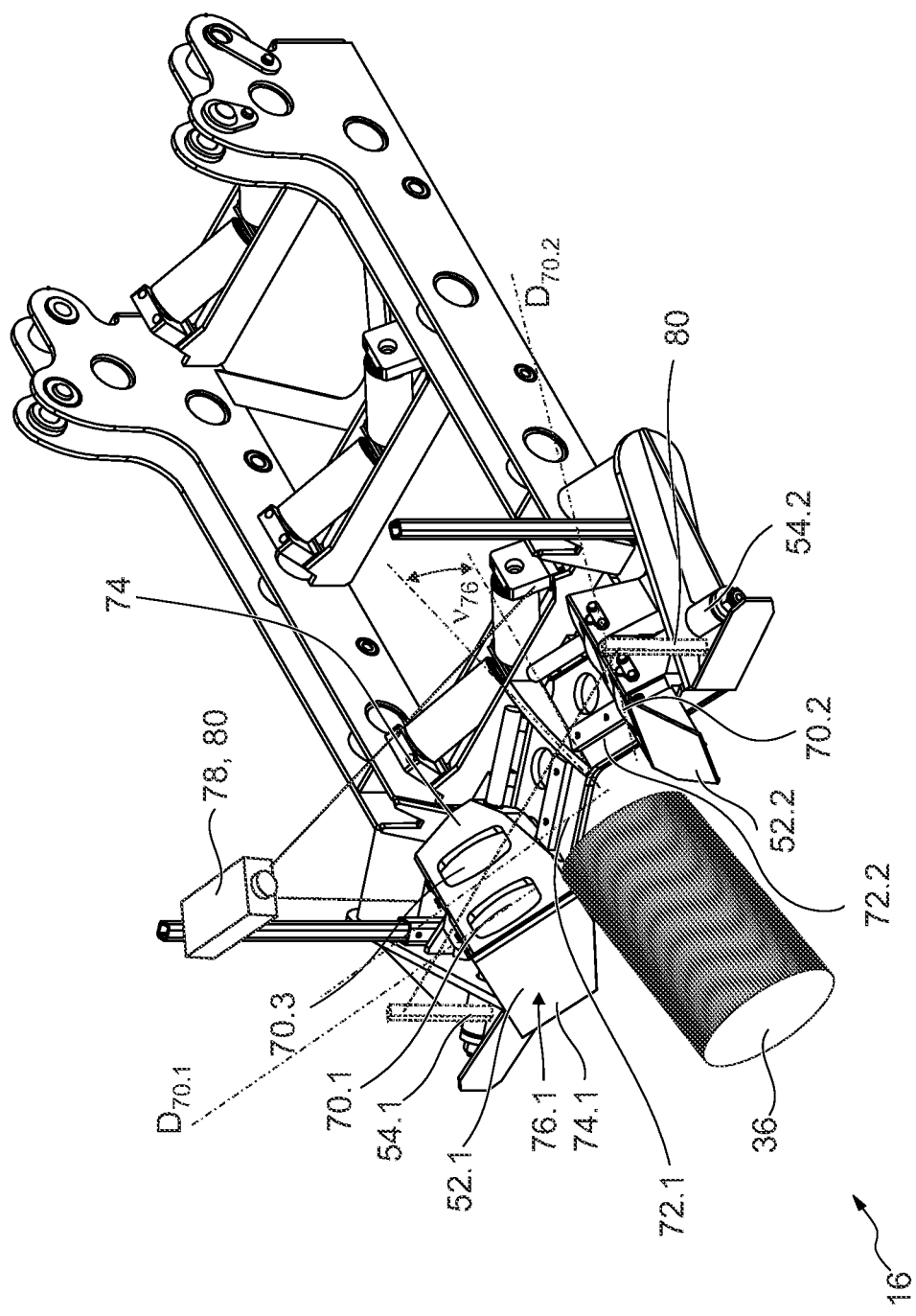

FIG. 3 shows that the first contact body 52.1 comprises a first wheel 70.1, which is rotatably mounted about a first wheel rotational axis $D_{70.1}$. The second contact body 52.2 has a second mounted wheel 70.2, which is rotatably mounted about a second wheel rotational axis $D_{70.2}$. As an option, the contact bodies 52.1, 52.2 may each feature at least one additional wheel 70.3, 70.4, which are rotatably mounted about corresponding rotational axes $D_{70.3}$, $D_{70.4}$. In the present case, the wheels 70.$k$ are designed to be spherical. However, this is not essential.

Figure 4A:
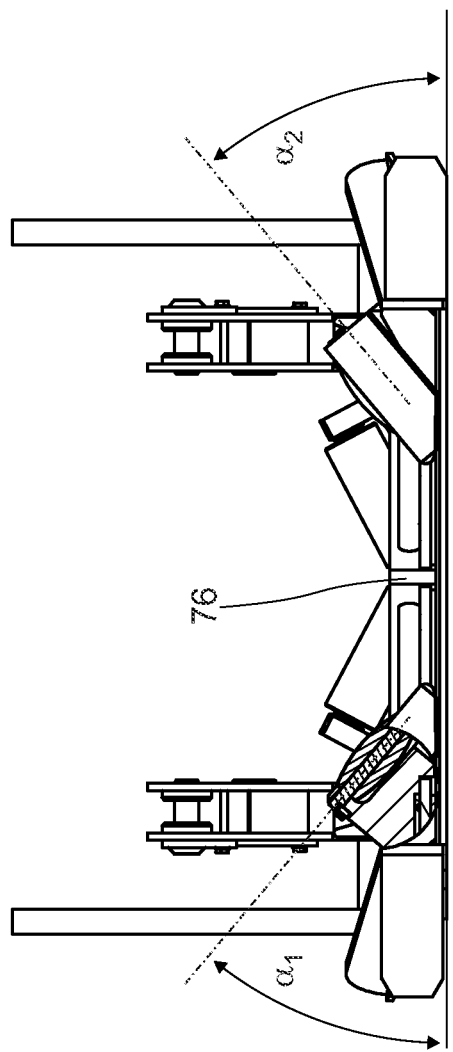
Figure 4B:
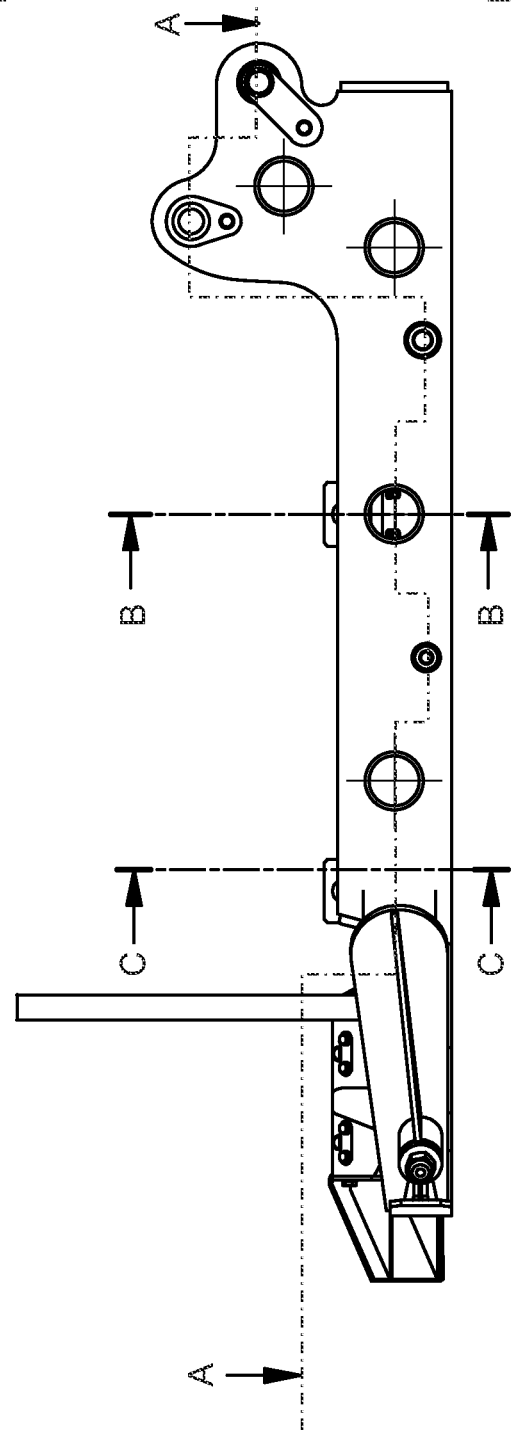

The rotational axis $D_{70.1}$ of the first wheel 70.1 extends at an angle of attack $\alpha_1$, (see FIG. 4$a$). The rotational axes $D_{70.k}$ of the remaining wheels 70.$k$ extend accordingly at an angle of attack $\alpha_k$. It is preferable, but not necessary, for the angles of attack to be the same. In the present case, the angle of attack is $\alpha_1=40°$.

The first contact body 52.1 is linearly guided by means of a first contact body longitudinal guide 72.1 (see FIG. 3). When the first contact body drive 54.1 is activated, the first contact body 52.1 moves towards the second contact body 52.2 as well as in the proximal direction, i.e. towards the driver's cabin 15.

Accordingly, the second contact body 52.2 is linearly guided by means of a second contact body longitudinal guide 72.2. When the second contact body drive 54.2 is activated, the second contact body 52.2 also moves towards the first contact body 52.1 as well as in the proximal direction.

Figure 5:
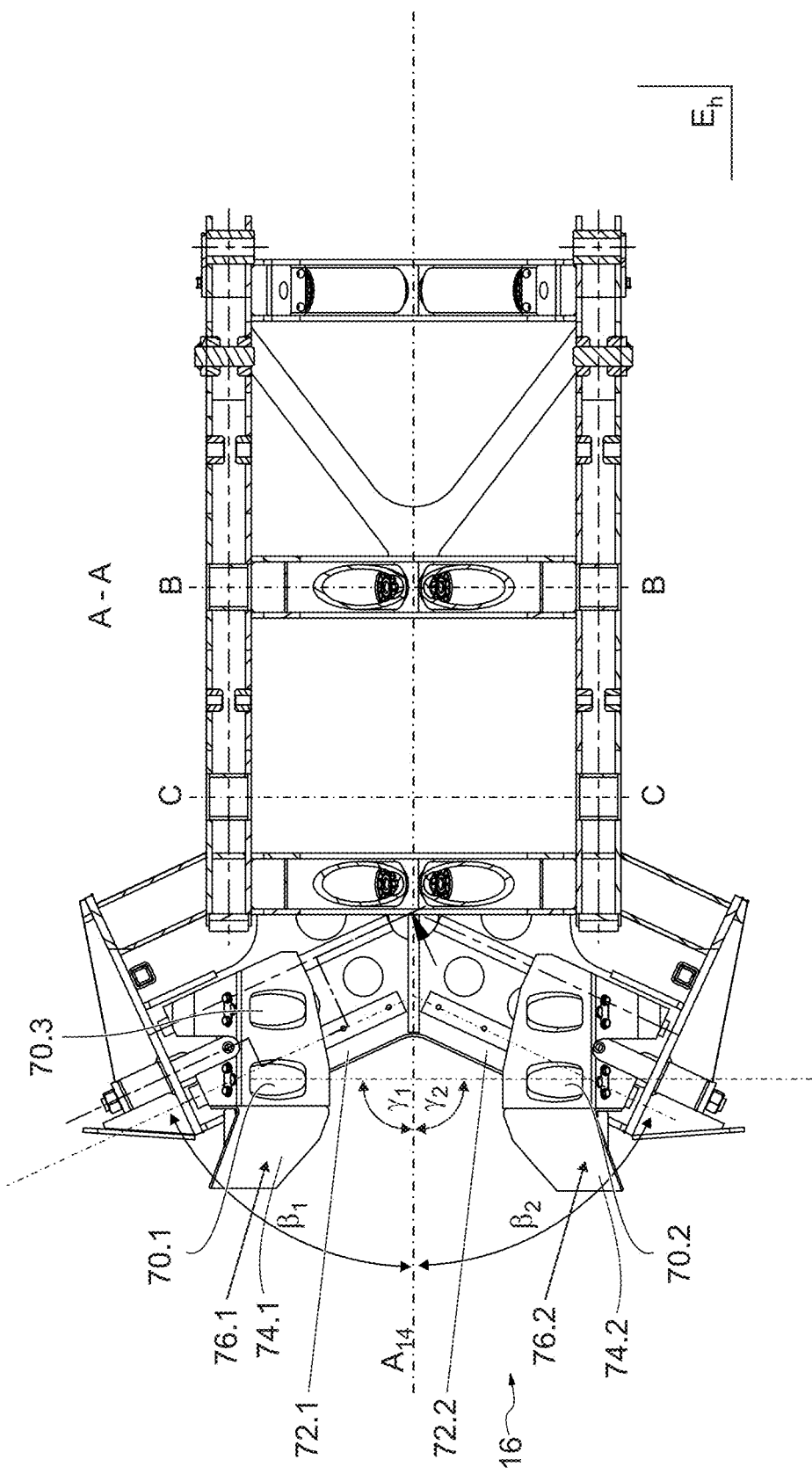

FIG. 5 shows that in the present case, a first bevel angle $\beta_1$, at which the first contact body longitudinal axis 72.1 extends to the pipe receiver longitudinal axis $A_{14}$ is $\beta_1=65°$. In general, the bevel angle can lie between $\beta_1=30°$ and $\beta_1=120°$, for example. In the present embodiment, the first bevel angle $\beta_1$ corresponds to a second bevel angle $\beta_2$, at which the second contact body longitudinal guide 72.2 extends to the pipe receiver longitudinal axis $A_{14}$. However, this is not essential.

FIG. 5 shows that a run-up skid 74.1 is arranged at the distal end of the contact body 52.1. The run-up skid 74.1 features a run-up surface 76.1 that extends transversely to the horizontal plane. In the present case, the run-up surface 76.1 extends at a run-up surface angle of inclination of $v_{76.1}$ to the horizontal plane (compare FIG. 6$b$). In the present case $v_{76.1}=47°$. The run-up surface angle of inclination $v_{76.1}$ may lie between 30° and 60°, for example, or be greater or smaller.

When the pipe welding machine 10 moves towards the pipe 36 (see FIG. 3), without the pipe 36 being lifted by the contact bodies 54.1, 54.2, the face of the pipe 36 comes into contact with the run-up surface 76 and is raised in such a way that it is lifted onto the roller conveyor 46.

However, this may cause the face to deform. This requires subsequent treatment, especially machining of the damaged parts of the face, which is time-consuming and therefore undesirable. During standard operation, therefore, the pipe 36 lifted by the contact bodies 52.1, 52.2 before it reaches the run-up skid 74.

To facilitate the activation of the contact bodies 52.1, 52.2 for an operator, for example in the driver's cabin 15, the pipe welding machine 10 can have a pipe position sensor 78. The pipe position sensor 78 may be formed by or feature a camera 80, for example. The camera records images that can be displayed on a screen 82 (see FIG. 1), not depicted, in the driver's cabin. Alternatively or additionally, the camera is equipped with an image recognition system, by means of which a position of the pipe 36 relative to the pipe receiver 14 can be detected.

The pipe position sensor 78 may also feature at least one light barrier 80, depicted here by the dashed line. However, other pipe position sensors 78 are conceivable, such as those that measure tactilely or electrically.

FIG. 5 depicts the tilt angles $\gamma_1$, $\gamma_2$ between a projection of the wheel rotational axis $D_{70.1}$ or $D_{70.2}$ onto the horizontal plane $E_h$ on the one hand and a projection of the pipe receiver longitudinal axis onto the horizontal plane $E_h$ on the other. The tilt angles $\gamma_1$, $\gamma_2$ are preferably 90±15°.

FIG. 4a shows a side view of the foot section 42. FIG. 5 is the section along the line A-A.

FIGS. 6a and 6b show that the first linearly moveable contact body 52.1 comprises a first base body 84.1. The second linearly moveable contact body 52.2 has a second base body 84.2. Both base bodies 84.1, 84.2 are made of metal, for example, in particular steel or aluminum.

A scratch-protection 86.1 is arranged on the first base body 84.1. In the present case, the scratch protection 86.1 comprises multiple scratch protection elements 88.1.1, . . . , 88.1.6, each of which is made of hard rubber that has been vulcanized onto a support strip. The anti-scratch material, for example the hard rubber in the present case, preferably exhibits a hardness of 22 to 40 Shore D.

The scratch protection elements are screwed to the base body 84.1. Accordingly, a scratch protection 86.2 is arranged on the second base body 84.2 that is also made up of multiple scratch protection elements 88.2.1, . . . . Parts of the surfaces of the scratch protection 86.1 and 86.2 form a contact surface 90 of the contact body 52, in that the contact body comes into contact with the pipe 36 when it is lifted. FIG. 6c shows a perspective view of the contact bodies 52.1, 52.2. The contact bodies 52.1, 52.2 and the contact body longitudinal guide 72 form a receiving head 91.

FIG. 7a depicts a view in viewing direction A. It should be noted that the first contact body 52.1 is connected for movement purposes by means of the first drive 54.1, here in the form of a hydraulic cylinder. The second contact body 52.2 can be moved by means of the second drive 54.2, here in the form of a second hydraulic cylinder.

FIG. 7b depicts an alternative embodiment of the receiving head 91 with a concavely curved contact surface 90. A sliding cylinder radius $R_{90}$ of a sliding cylinder 94 corresponds in particular at least to the nominal diameter $R_{36}$ of the pipe 36. In the present case, the sliding cylinder radius $R_{90}$ is 1.05 times a nominal diameter $R_{36}$.

| Reference list | |
|---|---|
| 10 | pipe welding machine |
| 12 | welding unit |
| 14 | pipe receiver |
| 15 | driver's cabin |
| 16 | distal end |
| 18 | proximal end |
| 20 | chassis |
| 22 | movement device |
| 24 | running gear |
| 26 | motor |
| 28 | hydraulic cylinder |
| 30 | coordinate system |
| 32 | pipe centering |
| 34 | support roller |
| 36 | pipe |
| 38 | guide roller |
| 40 | yoke |
| 42 | foot section |
| 44 | main section |
| 45 | roller |
| 46 | roller conveyor |
| 47 | machine control unit |
| 48 | hydraulic unit |
| 50 | pipe lifter |
| 52 | contact body |
| 54 | contact body drive |
| 56 | pipeline section |
| 58 | pipeline guide |
| 70 | wheel |

| Reference list | |
|---|---|
| 72 | contact body longitudinal guide |
| 74 | run-up skid |
| 76 | run-up surface |
| 78 | pipe position sensor |
| 80 | camera |
| 82 | screen |
| 84 | base body |
| 86 | scratch protection |
| 88 | scratch protection element |
| 90 | contact surface |
| 91 | receiving head |
| $\alpha$ | angle of attack |
| $\beta$ | bevel angle |
| $\gamma$ | tilt angle |
| $v_{76}$ | run-up surface angle of inclination |
| $v_{14}$ | angle of inclination |
| A | viewing direction |
| $A_{14}$ | pipe receiver longitudinal axis |
| $A_R$ | pipe longitudinal axis |
| $A_s$ | welding axis |
| B | ground |
| $D_{70.k}$ | wheel rotational axis |
| D | centering inner circle diameter |
| $D_{64}$ | cradle rotational axis |
| $E_h$ | horizontal plane |
| F | direction of travel |
| H | horizontal |
| $h_{16}$ | elevation |
| $h_A$ | welding axis height |
| j | running index of rollers |
| j | running index of rollers |
| k | running index of wheels |
| K | centering inner circle |
| R | direction of movement |
| $R_{90}$ | sliding cylinder radius |
| $R_{36}$ | nominal diameter |
| v | angle of inclination |

The invention claimed is:

1. A mobile pipe welding machine, comprising:
a welding unit for welding pipes;
a pipe receiver for guiding a pipe to the welding unit, wherein the pipe receiver comprises
(i) a distal end facing away from the welding unit, and
(ii) a proximal end facing the welding unit;
at least one linearly movable contact body for lifting the pipe positioned at the distal end of the piper receiver;
at least one contact body drive configured to move the at least one contact body along a linear path from a neutral position, in which the at least one contact body does not lift the pipe, and into a lifting position, in which the at least one contact body lifts the pipe; and
a run-up skid which
is proximally in a longitudinal direction in relation to the longitudinal axis of the pipe receiver behind a distal end of the at least one contact body in the neutral position, and
has a run-up surface that extends transverse to a horizontal plane.

2. The mobile pipe welding machine according to claim 1, wherein the at least one linearly moveable contact body has a contact surface that comes into contact with the pipe when the pipe is lifted, and further comprising a scratch protection made of anti-scratch material arranged on the contact surface, wherein the anti-scratch material is non-metallic.

3. The mobile pipe welding machine according to claim 2 wherein the anti-scratch material is selected from the group consisting of an elastomer, a thermoset, a thermoplastic, and a rubber.

4. The mobile pipe welding machine according to claim 1 wherein the contact surface is at least partially concavely curved and/or has a sliding cylinder radius which is at most a factor of 3 of a nominal diameter of the pipe.

5. The mobile pipe welding machine according to claim 1 wherein the at least one linearly movable contact body comprises at least one rotatably mounted wheel which is rotatably mounted about a wheel rotational axis.

6. The mobile pipe welding machine according to claim 5 wherein the wheel rotational axis extends at an angle of attack of at least 20° relative to a horizontal plane.

7. The mobile pipe welding machine according to claim 6 wherein the angle of attack is at least 30° relative to the horizontal plane.

8. The mobile pipe welding machine according to claim 1 wherein the at least one linearly movable contact body comprises at least a first contact body and a second contact body, wherein the first contact body and the second contact body are movable linearly towards and away from each other.

9. The mobile pipe welding machine according to claim 8 further comprising one or more of
(a) a first contact body drive which comprises a first contact body longitudinal guide for guided movement of the first contact body, and
(b) a second contact body drive which comprises a second contact body longitudinal guide for guided movement of the second contact body.

10. A mobile pipe welding machine, comprising:
a welding unit for welding pipes; and
a pipe receiver for guiding a pipe to the welding unit,
wherein the pipe receiver comprises
a distal end facing away from the welding unit, and
a proximal end facing the welding unit, wherein the pipe receiver comprises at the distal end at least one linearly movable contact body for lifting the pipe,
wherein the at least one linearly moveable contact body has a base body, which is guided on the contact body longitudinal guide and is fixed to a scratch protection made of an anti-scratch material, and
wherein the based body is made of a base body material, and wherein a base body material hardness of the base body material is at least five times a Vickers hardness of the anti-scratch material and/or at least ten times a Shore D hardness of the base body material hardness.

11. The mobile pipe welding machine according to claim 2 wherein an anti-scratch material hardness of the anti-scratch material is at most 58 Shore D.

12. The mobile pipe welding machine according to claim 2 wherein an anti-scratch material hardness of the anti-scratch material is at most 45 Shore D.

13. The mobile pipe welding machine according to claim 1 further comprising one or more contact body longitudinal guides arranged for guiding the at least one linearly movable contact body.

14. The mobile pipe welding machine according to claim 13 wherein the one or more contact body longitudinal guides include at least a first contact body longitudinal guide and a second contact body longitudinal guide which extend transversely towards each other.

15. The mobile pipe welding machine according to claim 14 wherein the first contact body longitudinal guide and the second contact body longitudinal guide form a V-shape.

16. A mobile pipe welding machine, comprising:
a welding unit for welding pipes; and
a pipe receiver for guiding a pipe to the welding unit,
wherein the pipe receiver comprises
a distal end facing away from the welding unit, and
a proximal end facing the welding unit,
wherein the pipe receiver comprises at the distal end at least one linearly movable contact body for lifting the pipe,
one or more contact body longitudinal guides arranged for guiding the at least one linearly movable contact body,
wherein the one or more contact body longitudinal guides include at least a first contact body longitudinal guide and a second contact body longitudinal guide which extend transversely towards each other,
wherein
(a) the first contact body longitudinal guide extends at a first bevel angle to a longitudinal axis of the pipe receiver that is at least 30° and/or at most 85°, and/or
(b) the second contact body longitudinal guide extends at a second bevel angle to the longitudinal axis of the pipe receiver that is at least 30° and/or at most 85°.

17. The mobile pipe welding machine according to claim 1, further comprising a pipe position sensor for detecting when the pipe is located in front of the pipe receiver in terms of a direction of travel of the pipe welding machine, and wherein the at least one contact body is designed to automatically move from a neutral position into a lifting position when the pipe position sensor falls short of a predetermined distance to the pipe.

18. The mobile pipe welding machine according to claim 1, further comprising:
a camera for recording images, wherein the at least one contact body is located in a field of vision of the camera, and
a screen for displaying the images in a driver's cabin of the pipe welding machine.

19. A method for producing a pipeline, comprising:
(i) moving a mobile pipe welding machine according to claim 1 towards a pipe),
(ii) lifting the pipe by linearly moving the at least one contact body of the pipe receiver of the pipe welding machine,
(iii) transporting the pipe on the pipe receiver to a welding unit of the pipe welding machine, and
(iv) welding the pipe to a pipeline section.

\* \* \* \* \*